US007063898B2

(12) United States Patent
Dees

(10) Patent No.: US 7,063,898 B2
(45) Date of Patent: Jun. 20, 2006

(54) SURFACE MODIFIED METAL PARTS

(75) Inventor: Robert J. Dees, Vista, CA (US)

(73) Assignee: Allfast Fastening Systems, Inc., City of Industry, CA (US)

( * ) Notice: Subject to any disclaimer, the term of this patent is extended or adjusted under 35 U.S.C. 154(b) by 24 days.

(21) Appl. No.: 10/768,218

(22) Filed: Jan. 30, 2004

(65) Prior Publication Data

US 2004/0234795 A1 Nov. 25, 2004

Related U.S. Application Data

(62) Division of application No. 10/411,629, filed on Apr. 11, 2003, now Pat. No. 6,733,837.

(51) Int. Cl.
*B32B 15/01* (2006.01)
*B32B 15/04* (2006.01)
*B32B 15/20* (2006.01)
*B64C 1/12* (2006.01)

(52) U.S. Cl. ...................... 428/650; 428/666; 428/470; 428/689; 428/699; 244/132

(58) Field of Classification Search ................ 428/650, 428/651, 666, 660, 457, 470, 689, 699; 244/132; 292/314; 470/27
See application file for complete search history.

(56) References Cited

U.S. PATENT DOCUMENTS

| | | | | |
|---|---|---|---|---|
| 5,789,085 | A | 8/1998 | Blohowiak et al. | |
| 5,814,137 | A | 9/1998 | Blohowiak et al. | |
| 5,849,110 | A | 12/1998 | Blohowiak et al. | |
| 5,858,133 | A | 1/1999 | Keener | |
| 5,866,652 | A | 2/1999 | Hager et al. | |
| 5,869,140 | A | 2/1999 | Blohowiak et al. | |
| 5,869,141 | A | 2/1999 | Blohowiak et al. | |
| 5,939,197 | A | 8/1999 | Blohowiak et al. | |
| 5,947,187 | A | 9/1999 | Blohowiak et al. | |
| 5,958,578 | A | 9/1999 | Blohowiak et al. | |
| 6,037,060 | A | 3/2000 | Blohowiak et al. | |
| 6,046,139 | A | 4/2000 | Blohowiak et al. | |
| 6,077,885 | A | 6/2000 | Hager et al. | |
| 6,086,664 | A | 7/2000 | Blohowiak et al. | |
| 6,171,704 | B1 * | 1/2001 | Mosser et al. | 428/450 |
| 6,207,236 | B1 | 3/2001 | Araki et al. | |
| 6,403,164 | B1 | 6/2002 | Jonschker et al. | |
| 6,506,499 | B1 | 1/2003 | Blohowiak et al. | |
| 6,579,472 | B1 | 6/2003 | Chung et al. | |
| 2002/0098345 | A1 * | 7/2002 | Kamo et al. | 428/336 |

FOREIGN PATENT DOCUMENTS

| | | |
|---|---|---|
| EP | 0 824 154 | 2/1998 |
| WO | WO 02/061173 | 8/2002 |

OTHER PUBLICATIONS

K.Y. Blohowiak, R.K. Jahren: "Rivet Rash the itch that won't heal" Boeing Environmental Technotes, 'Online! vol. 8, No. 3, Aug. 2003.

* cited by examiner

*Primary Examiner*—Michael E. Lavilla
(74) *Attorney, Agent, or Firm*—Blakely Sokoloff Taylor & Zafman LLP

(57) ABSTRACT

A method including forming a first layer comprising a chemical conversion coating on a metal surface; and forming a second layer on the first layer through a sol gel process. An apparatus including a metal component having at least one surface; a first layer comprising a chemical conversion coating on the at least one surface; and a second layer derived from a sol gel composition on the first layer.

6 Claims, 2 Drawing Sheets

SURFACE MODIFIED METAL PARTS

CROSS-REFERENCE TO RELATED APPLICATION

This application is a divisional of U.S. patent application Ser. No. 10/411,629, filed Apr. 11, 2003 (now U.S. Pat. No. 6,733,837, issued May 11, 2004.

FIELD OF THE INVENTION

Metal surface treatment.

BACKGROUND

The susceptibility of various metals to corrosion has been extensively studied. One field where this is particularly important is the aircraft or airline industry. The exterior of most aircraft are made primarily of metal material, particularly aluminum and titanium. In order to improve the corrosion resistance of metal component parts, particularly, an exterior surface of metal component parts, conversion coatings have been developed. Conversion coatings are generally electrolytic or chemical films that promote adhesion between the metal and adhesive resins. A common electrolytic process is anodization in which a metal material is placed in an immersing solution to form a porous, micro rough surface into which an adhesive can penetrate. Chemical films for treating titanium or aluminum include phosphate-fluoride coating films for titanium and chromate conversion films for aluminum.

Painting of metal surfaces is also of important commercial interest. In the aircraft or airline industry, the exterior metal surface of many commercial and government aircraft are painted at considerable expense. Techniques have been developed, through the use, for example, conversion coatings or sol gel processes to improve the adhesion of paints, particularly, urethane coatings that are common in the aircraft applications. With respect to sol gel coatings, U.S. Pat. Nos. 5,789,085; 5,814,137; 5,849,110; 5,866,652; 5,869,140; 5,869,141; and 5,939,197 describe sol gel technologies, particularly zirconium-based sol gel technologies for treating metal surfaces to improve corrosion resistance and adhesion, particularly, paint adhesion.

With respect to metal panels that make up an aircraft, sol gel coatings such as those described in the above-referenced patents have been shown to improve adhesion of epoxy-based and polyurethane paints.

Most panels (e.g., metal panels) that make up, for example, the body of an aircraft are held together by fasteners, particularly rivets. Such fasteners, particularly, the exposed surface of such fasteners must meet corrosion resistance standards mandated by aircraft manufacturers. The fasteners must also be able to maintain a coating, such as a paint (e.g., epoxy-based, polyurethane, polyimide) that may be utilized on the panels that make up the aircraft. One problem that has been identified is that paint that otherwise adheres acceptably to the exterior surfaces of aircraft panels, does not acceptably adhere to the fasteners (e.g., rivets) that join the panels. The condition where paint adherence failure occurs with fasteners in the aircraft industry is known as rivet rash.

In addition to paint adherence, metal panels in the aircraft or airline industry must meet certain corrosion resistance standards. One corrosion resistance standard for conversion coatings of aluminum is a salt spray test in accordance with MIL-C-5441. According to this standard, the chemical conversion coated panels undergo salt spray exposure for a minimum of 168 hours and must show no indication of corrosion under examination of approximately 10× magnification. Although not specifically stated in the MIL-C-5541 standard, aircraft manufacturers often require that fasteners such as rivets meet certain corrosion resistance standards. One aircraft manufacturer standard for rivets is a salt spray exposure for a minimum of 48 hours without indication of corrosion.

BRIEF DESCRIPTION OF THE DRAWINGS

Features, aspects, and advantages of embodiments of the invention will become more thoroughly apparent from the following detailed description, appended claims, and accompanying drawings in which:

DETAILED DESCRIPTION

A method of coating a metal surface is described. In one embodiment, a method includes forming a first layer including a chemical conversion coating on a metal surface and forming a second layer on the first layer through a sol gel process (e.g., a sol gel film). The method is useful, for example, in treating metal surfaces, particularly surfaces of metal (e.g., aluminum, titanium) fasteners to improve the corrosion resistance and the adhesion properties of the fastener for further treatment, such as for painting.

An apparatus is also described. In one embodiment, an apparatus includes a metal component, such as an aluminum or titanium fastener (e.g., rivet) having at least one surface. The at least one surface of the metal component includes a first layer comprising a chemical conversion coating and a second layer derived from a sol gel composition on the first layer. Through the use of a first and second layer, the adhesion properties of the metal component may be improved, particularly, for paint adherence to the at least one surface.

Figure 1:
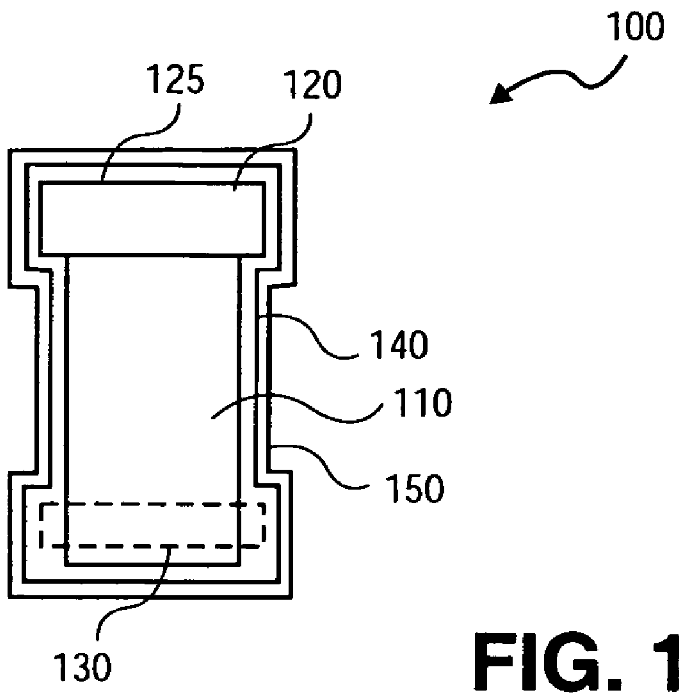
FIG. 1 shows a schematic side view of a rivet having the exposed surfaces thereof coated with a chemical conversion coating and a sol gel coating.

FIG. 1 shows a schematic side view of a fastener. Fastener 100 is, for example, a rivet suitable for use in fastening metal component panels of aircraft or other vehicles. In this embodiment, fastener 100 is a metal material, such as aluminum or titanium. Fastener 100 includes shank 110, head 120, and upset head 130 (shown in dashed lines in FIG. 1 as an upset head is formed on installation). In the embodiment where fastener 100 is a rivet, in one embodiment, shank 110, head 120, and upset head 130 are a unitary body of aluminum material. Suitable grades of aluminum for a rivet in the aircraft or airline industry include, but are not limited to, 2017 and 7050 aluminum. Representative diameters, in inches, for rivets for use in the aircraft industry to fasten panels range from 3/32 to 8/32 and larger, depending on the particular fastening or other application.

Referring to FIG. 1, fastener 100 includes first layer 140 of a chemical conversion coating, in this embodiment, directly disposed on or in direct contact with exterior and/or exposed surfaces of fastener 100. For an aluminum material of fastener 100 (e.g., shank 110, head 120, and upset head 130 of aluminum material), a suitable chemical conversion coating includes, but is not limited to, a chromate conversion coating. One suitable coating is ALCHROME 2™, commercially available from Heatbath Corporation of Indian Orchard, Mass. ALCHROME 2™ includes chromic acid, potassium ferricyanide, sodium nitrate, and sodium silicofluoride. A suitable thickness of first layer 140 of ALCHROME 2™ on a fastener that is an aluminum rivet is, for example, on the order of less than one mil to pass the MIL-C-5541 salt spray standard for a fastener (e.g., 48 hour salt spray exposure). One suitable conversion coating for a titanium material is a phospho-fluoride coating.

In addition to first layer 140, fastener 100 shown in FIG. 1 also includes second layer 150 shown disposed on first layer 140. In one embodiment, second layer 150 is formed by a sol gel process (e.g., a sol gel film). Representative sol gel films that may be suitable as second layer 150 are sol gel films that, in one embodiment, promote adhesion of an epoxy or a polyurethane coating (e.g., paint) to fastener 100. In one embodiment, second layer 150 of a sol gel film is formed according to the teachings described in U.S. Pat. Nos. 5,789,085; 5,814,137; 5,849,110; 5,866,652; 5,869,140; 5,869,141; and 5,939,197. Suitable sols include solutions of zirconium organometallic salts, including alkoxyzirconium organometallic salts, such as tetra-i-propoxyzirconium or tetra-n-propoxyzirconium and an organosilane coupling agent, such as 3-glycidoxypropyl trimethoxysilane for epoxy or polyurethane systems. One suitable sol gel film for epoxy or polyurethane systems (e.g., an epoxy-based or polyurethane-based coating) is produced by components provided Advanced Chemistry and Technology (AC Tech™) of Garden Grove, Calif. Such components include glacial acetic acid (AC Tech™-131 Part A); a sol of zirconium n-propoxide (greater than 65 percent by weight) and n-propanol (greater than 25 percent by weight) (AC Tech™-131 Part B); an organosilane coupling agent of 3-glycidoxypropyl trimethoxysilane (AC Tech™-131 Part C); and water (AC Tech™-131 Part D). The component parts are combined/mixed to form a sol gel solution. A sol gel film for second layer 150 may be applied by immersing, spraying, or drenching fastener 100 with a sol gel solution without rinsing. After application, fastener 100 including the sol gel solution is dried at an ambient temperature or heated to a temperature between ambient of 140° F. to form a sol gel film. A suitable thickness of second layer 150 on a fastener that is an aluminum rivet having a chemical conversion coating layer (e.g., first layer 140) is on the order of less than one mil. The embodiment of fastener (e.g., rivet) shown in FIG. 1 with first layer 140 of ALCHROME 2™ chemical conversion material and second layer 150 of the referenced AC Tech™ components, a layer formed by a sol gel process (e.g., a sol gel film), passes a 48 hour salt spray test performed in accordance with MIL-C-5541. A rivet with only the sol gel film formed by the AC Tech™ components did not pass a similar 48 hour salt spray test.

Figure 2:
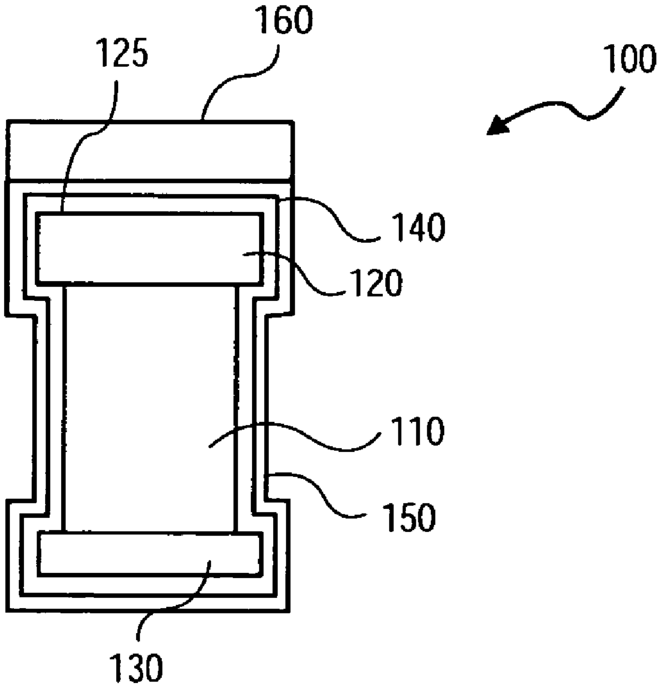
FIG. 2 shows the rivet of FIG. 1 having a paint coating applied to one surface of the rivet.

FIG. 2 shows fastener 100 of FIG. 1 following the introduction of coating 160, such as a paint. Fastener 100 is a rivet in this example and is an installed configuration with upset head 130 formed. Coating 160, as a paint, includes an epoxy-based paint system, a polyurethane-based system, or a polyimide-based system. As noted above, fastener 100 including first layer 140 of ALCHROME 2™, and second layer 150 of a sol gel film produced from the AC Tech™ components has been shown to meet the corrosion resistance standard of MIL-C-5541 (e.g., a 48 hour salt spray test). Fastener 100 of an aluminum material with first layer 140 of ALCHROME 2™ and second layer 150 of a sol gel film produced from AC Tech™ components referenced above has also been shown to have acceptable adhesion properties for coating 160 of an epoxy-based or polyurethane-based coating (paint) than a fastener (e.g., rivet) coated with only a chemical conversion layer.

Figure 3:
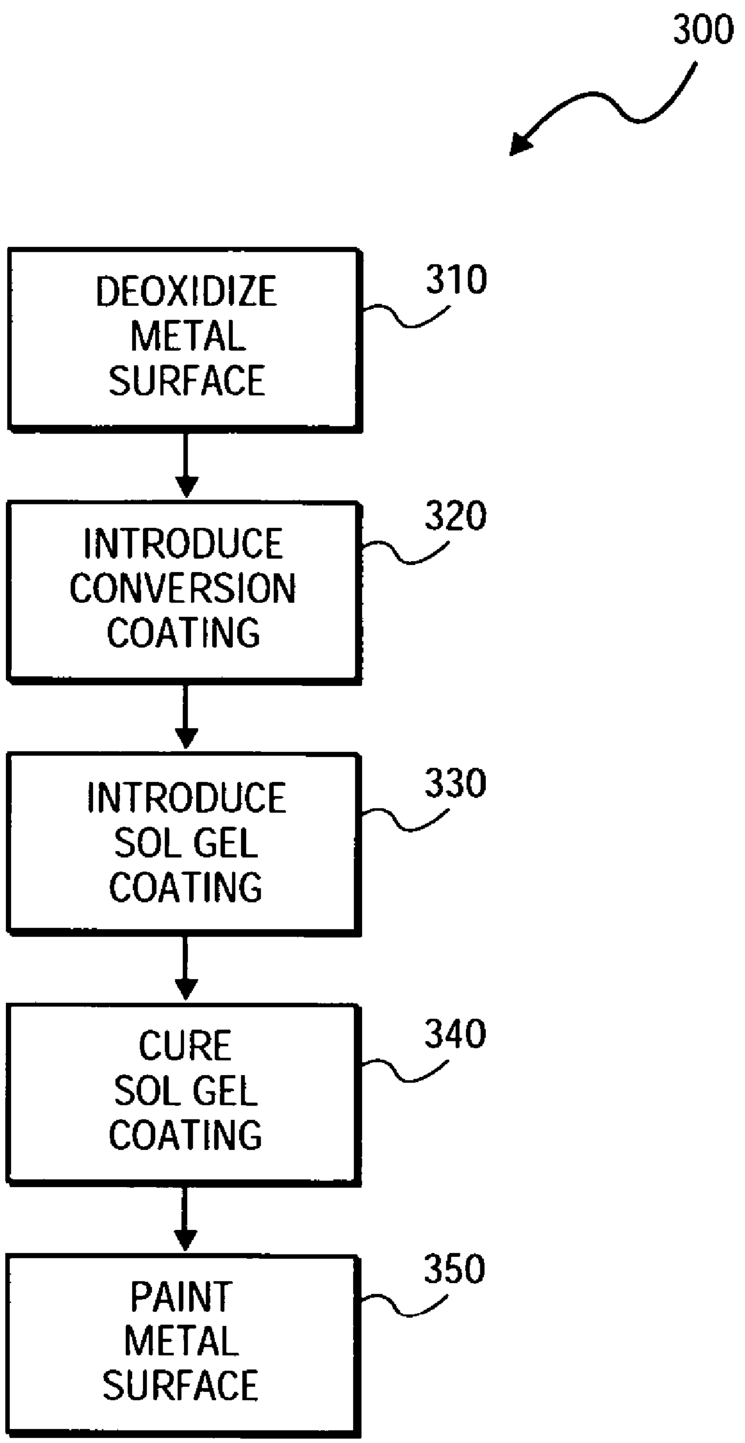
FIG. 3 shows a flow chart of a method for coating a metal surface.

FIG. 3 shows a flow chart of a process of forming multiple layers on a metal surface such as a metal fastener, for example, metal fastener 100 described with reference to FIG. 1 and FIG. 2 and the accompanying text. The following process is described with respect to rivets as fasteners. Such rivets are suitable for use in the aircraft industry to fasten panels of the aircraft body to one another. In such instances, the head of the individual rivets will be exposed to the environment and therefore must meet the standards of the aircraft manufacturers (e.g., standard such as MIL-C-5541 for corrosion resistance and paint adhesion standard).

Referring to FIG. 3 and process 300, a metal material, such as an aluminum or titanium metal rivet or rivets, are treated to remove or reduce an oxide formed on the surface. It is appreciated that metal such as aluminum and titanium oxidize in the presence of oxygen, such as atmospheric oxygen. In block 310, the metal surface, particularly metal surfaces that are to be exposed such as heads of fasteners (e.g., heads of rivets) that hold panels together are deoxidized by chemical or physical (e.g., sputtering) means to provide a predominantly oxide free surface.

Following the deoxidization of a metal surface or surfaces, a conversion coating is introduced (block 320) to the metal surface or metal surface of the rivet(s). For an aluminum rivet, a chemical conversion coating, such as ALCHROME 2™, is applied in accordance with MIL-C-5541. Suitable techniques for introducing chemical conversion coating of ALCHROME 2™ include immersion, spraying, or drenching the metal surface in a solution of the chemical conversion coating material. In the example of rivets as fasteners, a number of rivets may be placed in a basket, such as a perforated metal basket, and immersed in a chemical conversion coating solution for 1.5 minutes.

Following the introduction of a conversion coating, the rivet(s) is/are double rinsed in successive water baths and dried, such as by exposing the rivet to a centrifugal or other drying process, including a standing air dry process. The rivet(s) is/are then brought to room temperature if necessary. Within a specified period, such as within 24 hours, a sol gel film is introduced on an exterior surface of the rivet. Suitable ways for introducing a sol gel film include immersion coating, spraying, and drenching the rivet(s) in a sol gel solution (block 330). In the example where a sol gel coating is applied by immersing, representatively the rivet(s) is/are immersed in a solution including a sol gel for a period of a few to several minutes. In one embodiment, the rivet(s) is/are immersed in a solution including a sol gel for two to three minutes. During immersion, the sol gel solution may be agitated to improve the coating uniformly. The rivet(s) is/are then removed from a sol gel coating solution and centrifuged to remove excess sol get solution (e.g., centrifuged in a DESCO™ centrifuge for 30 seconds).

Once a sol gel coating is applied to a rivet(s), the sol gel coating is cured (block 340). In one embodiment, a curing process includes heating the rivet in a preheated oven to a cured temperature. A cure temperature for the sol gel coating solution described above commercially available from Advanced Chemistry and Technology includes exposing the rivet(s) including the sol gel coating to a preheated oven at a 130° F.±10° F. for a sufficient time, typically on the order of 45 to 90 minutes. The following table illustrates curing times for curing a number of rivets at one time (e.g., a number of rivets as a layer in a perforated tray).

| RIVET DIAMETER (×1/32) | TRAY THICKNESS (inches) | DRYING TIME (MINUTES) |
|---|---|---|
| −3 and −4 | 0.5 | 50–60 |
| −5 thru −7 | 1 | 50–60 |
| −8 and larger | 1.5 | 50–60 |

Following curing of a layer formed by sol gel process (e.g., a sol gel film), the rivet(s) is/are cooled and a surface of the rivet(s) is/are ready for a coating. Representatively, an epoxy, polyurethane, or polyimide coating may be applied to the surface containing the sol gel film (block 350).

In the preceding paragraphs, specific embodiments are described. It will, however, be evident that various modifications and changes may be made thereto without departing from the broader spirit and scope of the claims. The specification and drawings are, accordingly, to be regarded in an illustrative rather than a restrictive sense.

What is claimed is:

1. An apparatus comprising:

a metal fastener having at least one surface;

a first layer comprising a chemical conversion coating on the at least one surface; and a second layer derived from a sol gel composition on the first layer, wherein the second layer is formed on the first layer such that second layer is separated from the at least one surface of the fastener by the first layer.

2. The apparatus of claim 1, wherein the at least one surface of the fastener comprises aluminum.

3. The apparatus of claim 2, wherein the first layer comprises a reaction product of aluminum and a chromium moiety.

4. The apparatus of claim 1, wherein the sol gel composition comprises zircomum.

5. The apparatus of claim 1, wherein the fastener comprises a rivet.

6. The apparatus of claim 1, wherein the fastener comprises an aluminum material, the first layer comprises a reaction product of aluminum and a chromium moiety, and the second layer is derived from a zirconium organometallic salt and an organosilane coupling agent.

* * * * *